(12) United States Patent
Huang et al.

(10) Patent No.: US 9,979,678 B2
(45) Date of Patent: *May 22, 2018

(54) METHODS AND SYSTEMS FOR PROVIDING NETWORK ACCESS REDUNDANCY

(71) Applicant: III HOLDINGS 1, LLC, Wilmington, DE (US)

(72) Inventors: Kaiyuan Huang, Ontario (CA); Michael F. Kemp, Ontario (CA)

(73) Assignee: III HOLDINGS 1, LLC, Wilmington, DE (US)

( * ) Notice: Subject to any disclaimer, the term of this patent is extended or adjusted under 35 U.S.C. 154(b) by 25 days.

This patent is subject to a terminal disclaimer.

(21) Appl. No.: 14/989,904

(22) Filed: Jan. 7, 2016

(65) Prior Publication Data

US 2016/0119254 A1   Apr. 28, 2016

Related U.S. Application Data

(63) Continuation of application No. 12/255,587, filed on Oct. 21, 2008, now Pat. No. 9,237,034.

(51) Int. Cl.
*H04L 12/939* (2013.01)
*G06F 11/20* (2006.01)
(Continued)

(52) U.S. Cl.
CPC ........ *H04L 49/557* (2013.01); *G06F 11/2005* (2013.01); *G06F 11/2007* (2013.01);
(Continued)

(58) Field of Classification Search
CPC ............. G06F 11/2005; G06F 11/2007; H04L 12/4641; H04L 43/0811; H04L 45/123;
(Continued)

(56) References Cited

U.S. PATENT DOCUMENTS 6,631,422 B1   10/2003  Althaus et al.
7,324,553 B1   1/2008   Varier et al.
(Continued)

FOREIGN PATENT DOCUMENTS

WO        8800732 A1    1/1988

OTHER PUBLICATIONS

International Search Report Issued in International Application No. PCT/CA2009/001420, dated Jan. 22, 2010.
(Continued)

*Primary Examiner* — Stephen J Clawson
(74) *Attorney, Agent, or Firm* — Brundidge & Stanger, P.C.

(57) ABSTRACT

In a networked multi computer environment with redundant links, network interface cards (NICs) are commonly duplicated and teamed to provide a recovery mechanism when network components fail. Embodiments of the present inventions avoid teaming of pairs of NICs and provide a computing host with redundant network connections for the computing host through a switch that is transparent to the computing host. The computing host itself; that is, its hardware and software, is relieved of the duty of network access redundancy and returned to the simple, simplex networking operating mode. The switch replaces a potentially large number of NICs and the need for computing host network access redundancy management which leads to hardware and software cost reductions and increases the robustness and reliability of the system through redundant network access.

20 Claims, 9 Drawing Sheets

(51) Int. Cl.
*H04L 12/46* (2006.01)
*H04L 12/707* (2013.01)
*H04L 12/703* (2013.01)
*H04L 12/753* (2013.01)
*H04L 12/721* (2013.01)
*H04L 12/26* (2006.01)

(52) U.S. Cl.
CPC ........ *H04L 12/4641* (2013.01); *H04L 45/123* (2013.01); *H04L 45/22* (2013.01); *H04L 45/28* (2013.01); *H04L 45/48* (2013.01); *H04L 43/0811* (2013.01)

(58) Field of Classification Search
CPC ......... H04L 45/22; H04L 45/28; H04L 45/48; H04L 49/557
USPC ....................................................... 370/219
See application file for complete search history.

(56) References Cited

U.S. PATENT DOCUMENTS

| | | | |
|---|---|---|---|
| 2002/0023170 A1 | 2/2002 | Seaman et al. | |
| 2002/0052936 A1 | 5/2002 | Gai et al. | |
| 2002/0150039 A1* | 10/2002 | Valdevit | H04L 45/02 370/216 |
| 2002/0164981 A1 | 11/2002 | Parkman | |
| 2002/0187770 A1* | 12/2002 | Grover | H04L 45/00 455/403 |
| 2003/0009582 A1* | 1/2003 | Qiao | H04L 12/5695 709/233 |
| 2003/0012285 A1 | 1/2003 | Kim | |
| 2003/0018812 A1* | 1/2003 | Lakshminarayana | H04L 45/12 709/241 |
| 2003/0123390 A1 | 7/2003 | Takase et al. | |
| 2003/0123451 A1 | 7/2003 | Nielsen et al. | |
| 2003/0169734 A1 | 9/2003 | Lu et al. | |
| 2003/0236932 A1 | 12/2003 | Saito | |
| 2004/0047300 A1* | 3/2004 | Enomoto | H04L 12/462 370/256 |
| 2004/0062209 A1* | 4/2004 | Goldman | H04L 45/02 370/256 |
| 2004/0064583 A1 | 4/2004 | Dani et al. | |
| 2004/0073637 A1 | 4/2004 | Larson et al. | |
| 2004/0078599 A1 | 4/2004 | Nahum | |
| 2004/0090957 A1 | 5/2004 | Lespagnol | |
| 2004/0158770 A1 | 8/2004 | Kaiser | |
| 2004/0165525 A1 | 8/2004 | Burak et al. | |
| 2005/0120025 A1 | 6/2005 | Rodriguez et al. | |
| 2005/0256975 A1 | 11/2005 | Kaniz et al. | |
| 2007/0073883 A1 | 3/2007 | Chafle et al. | |
| 2007/0076590 A1 | 4/2007 | Galpin et al. | |
| 2007/0110088 A1 | 5/2007 | Kemp | |
| 2007/0141995 A1 | 6/2007 | Youn et al. | |
| 2007/0183313 A1 | 8/2007 | Narayanan et al. | |
| 2008/0043742 A1 | 2/2008 | Pong et al. | |
| 2008/0215910 A1 | 9/2008 | Gabriel et al. | |
| 2008/0247409 A1 | 10/2008 | Choudhury et al. | |

OTHER PUBLICATIONS

Written Opinion Issued in International Application No. PCT/CA2009/001420, dated Jan. 22, 2010.
Kevin J. Barker et al., On the Feasibility of Optical Circuit Switching for High Performance Computing Systems, Proceeding of the ACM/IEEE, SC 2005 Conference, Nov. 18, 2005, 22 pages.
IEEE Standard for Local and Metropolitan Area Networks, Virtual Bridged Local Area Networks, IEEE Std 802. IQ, Sep. 2005, pp. 132-133, 16-17 and 35.
International Search Report issued in International Application No. PCT/CA2008/001498, dated Dec. 11, 2008.
Written Opinion issued in International Application No. PCT/CA2008/001498, dated Dec. 11, 2008.
ANS/IEEE Std, 802, 1D, 1998 Edition, Part 3: Media Access Control Bridges, Dec. 10, 1998, IEEE.
David Davis, Apr. 28, 2008 Teaming NIC's achieves load balance and failover on VMware ESX, printed from http://searchvmware.techtarget.com/tip/0,289483,sid179_gci1311518,00.html, Apr. 2006.
Understanding and Configuring Spanning Tree Protocol (802.1w). CISCO Document ID 24062, printed from http://searchvmware.techtarget.com/tip/0,289483,sid179_gci1311518,00.html, Aug. 2006.
Understanding Rapid Spanning Tree Protocol (802.1w). CISCO Document ID 24062, printed from http://searchvmware.techtarget.com/tip/0,28948., sid179_gci1311518,00.html, Oct. 2006.
Understanding Spanning-Tree Protocol, Cisco Documentation, Copyright May 1989-1997 Cisco Systems Inc., printed from http://www.cisco.com/univered/cc/td/dco/product/rtrmgmt/sw_ntman/cwsimain/cwsi2/cwsiug2/vlan2/stpapp.html.
Rapid/Multiple Spanning Tree Protocol (RSTP/MSTP), Copyright Dec. 2007 Aricent, Inc., printed from www.futsoft.com/pdf/RSTPMSTPfs.pdf.
William J. Daily, Scalable Switching Fabrics, for Internet Routers, Computer Systems Laboratory, Stanford University and Avici Systems, Inc., Jul. 27, 2010.
HyperTransport specification; http://~.hypertransport.org/tech/index.cfm, Apr. 24, 2006.
InfiniBand specification; http://www'.infinibandta.org/specs/, Nov. 2012.

* cited by examiner

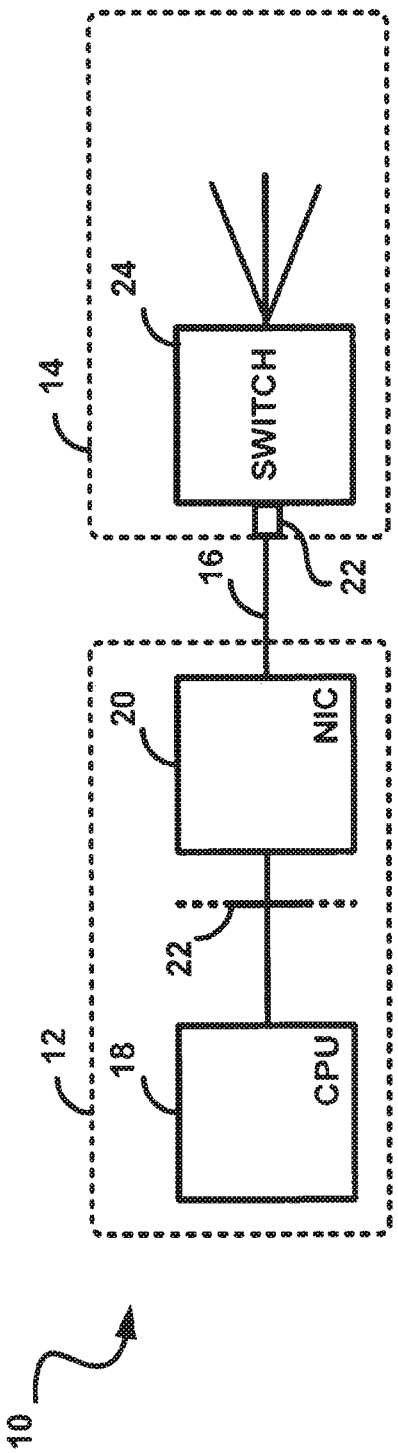
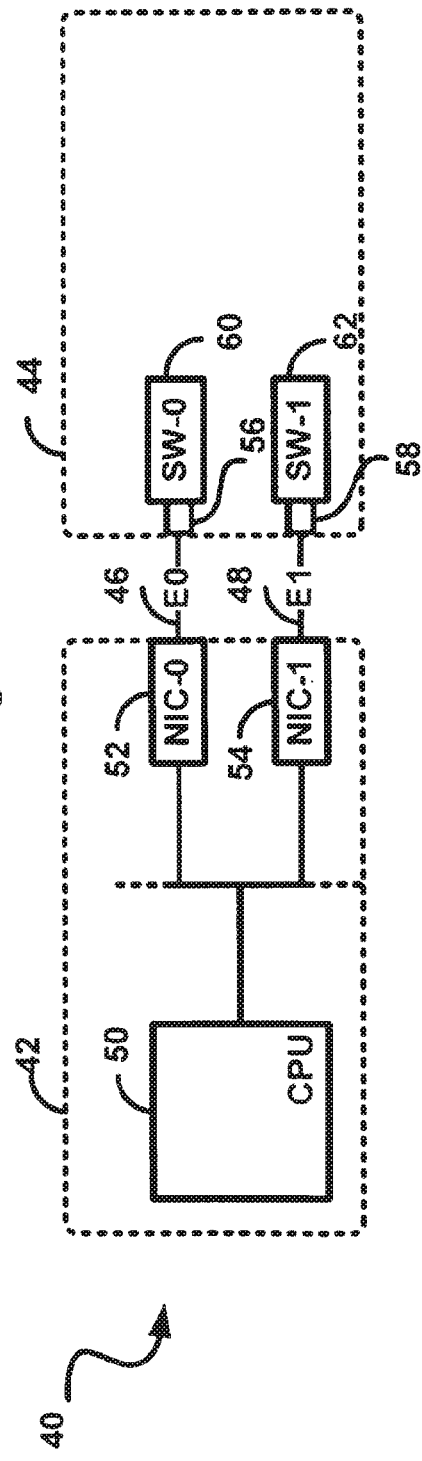
FIG. 1
FIG. 2

METHODS AND SYSTEMS FOR PROVIDING NETWORK ACCESS REDUNDANCY

CROSS-REFERENCE TO RELATED APPLICATIONS

This application is a Continuation Application of U.S. Ser. No. 12/255,587, filed on Oct. 21, 2008, which is related in subject matter to commonly assigned application entitled "High performance Network Adapter (HPNA)" filed on Sep. 11, 2007 as U.S. Ser. No. 11/853,306, now U.S. Pat. No. 7,769,015. The disclosures of both applications are hereby incorporated herein by reference in their entireties.

BACKGROUND OF THE INVENTION

1. Copyright Notice/Permission

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings referred to herein: Copyright 2008, Liquid Computing, Inc., All Rights Reserved.

2. Field of the Invention

Embodiments of the present inventions relate to multi-computer networked environments. More specifically, the embodiments of the present inventions relate to methods and systems for providing fault tolerant network connectivity in such environments.

SUMMARY OF THE INVENTION

An embodiment of the present inventions is a computer system that may include an access cluster, including: at least one computing host, each computing host including, without limitation, at least a processor and a Network Interface Card (NIC), and an access switch, the access switch being coupled to the NIC of each of the at least one computing host, the access switch including a first network-side port and a second network-side port; a first communication network, the first communication network including a first network-edge switch; a second network-edge switch; a first link coupling the first network-side port to the first network-edge switch, and a second link coupling the second network-side port to the second network-edge switch.

The first communication network may include the second network-edge switch. The computer system may further include a second communication network, the second communication network including the second network-edge switch. The access switch, the first network-edge switch and the second network-edge switch may be configured to run a spanning tree algorithm and, based upon a result of running the spanning tree algorithm, to select which of the first and second link to activate and enable to carry traffic. The first link or the second link may be designated as a primary link and the other one of the first or second links may be designed as an alternate link and only the primary link may be configured to be active and enabled to carry traffic until the active link or the first network-edge switch fails, whereupon the alternate link may be configured to be active and enabled to carry traffic between the second network-side port and the second network-edge switch.

The computer system may further include first and second Virtual Local Area Networks (VLANs), a first spanning tree algorithm associated with the first VLAN and a second spanning tree algorithm associated with the second VLAN. The first and second spanning tree algorithms may be configured to designate the first link as a primary link for the first VLAN and the second link as a primary link for the second VLAN. The first and second spanning algorithms may be configured to designate the second link as an alternate link for the first VLAN and to designate the first link as an alternate link for the second VLAN, and each of the alternate links may be configured to carry traffic only upon failure its corresponding primary link. The spanning tree algorithm may be configured to select which of the first and second link to activate, based at least in part on first and second port path costs associated with the first and second links, respectively, the link associated with a lowest port path cost being designated as the primary link and the link associated with a higher port path cost being designated as the alternate link, only the primary link being activated. A selected non-zero port path cost bias may be added to the one of the first and second port path costs associated with the alternate link such that, in an absence of a failure of the primary link or the network-edge switch to which the primary link is coupled, the port path cost associated with the primary link is lower than the port path cost associated with the alternate link and, upon detection of the failure, the port path cost associated with the primary link is increased (to infinity, for example) and the spanning tree algorithm may be configured to activate the alternate link and to cause all traffic previously carried by the primary link to be earned in the activated alternate link.

The access cluster may be a single field replaceable unit configured to accommodate the at least one computing host and the access switch. The NIC and the access switch may be combined or otherwise provided in a single device. The access switch may be or include a Media Access Control (MAC) bridge, the first network-edge switch may be or include a first network-edge MAC bridge and the second network-edge switch may be or include a second network-edge MAC bridge. The access switch may include a router, the first network-edge switch may include a first network-edge router and the second network-edge switch may include a second network-edge router.

According to another embodiment thereof, the present invention is a computer-implemented method. The method may include steps of providing a computing host that includes at least one processor and an access switch that includes first and second network-side ports; providing a first communication network, the first communication network including a first network-edge switch; providing a second network-edge switch; coupling the first network-side port to the first network-edge switch using a first link and coupling the second network-side port to the second network-edge switch using a second link; running a spanning tree algorithm and, based upon a result thereof, configuring one of the first and second links as a primary link and the other of the first and second links as an alternate link. Only the primary link is active and enabled to carry traffic until failure of the primary link, whereupon the alternate link may be activated and enabled to carry traffic.

The configuring step may include forcing a port path cost associated with a selected one of the first and second links to be higher than a port path cost associated with the other of the first and second links such that the spanning tree algorithm is configured to always configure the link associated with a lowest port path cost as the primary link. The forcing step may include adding a non-zero port path cost bias to the selected port path cost. The method may further include, upon failure network-edge switch or the primary link, a step of increasing (to infinity, for example) the port path cost associated with the primary link such that the port path cost of the alternate link is lower than the port path cost of the primary link and the spanning tree algorithm running step is carried out with the spanning tree algorithm activating and enabling the alternate link to carry traffic. The method may also include assigning a port path cost to the primary link, assigning a port path cost to the alternate link, adding a non-zero port path cost bias to the port path cost assigned to the alternate link and configuring the spanning tree algorithm to select as the primary link the one of the first and second links having a lowest port path cost. The method may also further include assigning a port priority to the primary link, assigning a port priority to the alternate link, adding a non-zero port priority bias to the port priority assigned to the alternate link and configuring the spanning tree algorithm to select as the primary link the one of the first and second links having a lowest port priority. The method may also include detecting a failure in the primary link or a failure in the one of the first and second network switches to which the primary link is coupled and, upon detection of the failure, enabling the alternate link to carry traffic. The second network-edge switch providing step may be carried out with the second network-edge switch being provided in the first communication network. The method may also include a step of providing a second communication network, and the second network-edge switch providing step may be carried out with the second network-edge switch being provided in the second communication network. The providing steps may be carried out with the access switch including a Media Access Control (MAC) bridge, with the first network-edge switch including a first network-edge MAC bridge and with the second network-edge switch including a second network-edge MAC bridge. The providing steps may carried out with the access switch including a router, with the first network-edge switch including a first network-edge router and with the second network-edge switch including a second network-edge router.

The method may also include configuring first and second Virtual Local Area Networks (VLANs) in the first communication network, and the running step may run a first spanning tree algorithm for the first VLAN and a second spanning tree algorithm for the second VLAN. Based upon running the first and second spanning tree algorithms, the method may also include configuring one of the first and second links as a primary link for the first VLAN and as an alternate link for the second VLAN and the other of the first and second links as an alternate link for the first VLAN and as a primary link for the second VLAN. The method may also include a step of enabling the second link to carry traffic for both the first and second VLANs upon failure of the first link and may further include a step of enabling the first link to carry traffic for both the first and second VLANs upon failure of the second link.

According to still another embodiment thereof, the present invention is a computer system, comprising: an access cluster that includes a plurality of computing hosts; an access switch, the access switch being coupled to each of the plurality of computing hosts, the access switch including at least two network-side ports; at least two links, each being coupled to one of the at least two network-side ports and to a network. Upon failure of any one of the at least two links, traffic between the one of the at least two network-side ports coupled to the failed link may be switched to the other one of the at least two network-side ports.

The access cluster may include a field replaceable unit configured to accommodate the at least one computing host and the access switch. One of the at least two links may be associated with a first port path cost and the other ones of the at least two links may be associated with respective second port path costs each higher than the first port path cost. Failure of the link associated with the first port path cost causes the first port path cost to increase (to infinity, for example) and execution of a spanning tree algorithm causes the switching of the traffic to a link associated with a next lowest port path cost. Each computing host of the access cluster may include, without limitation, at least one processor and a network interface card (NIC) (and associated memory), the NIC being coupled to the access switch. The access switch may include a Media Access Control (MAC) bridge.

Lastly, a still further embodiment of the present inventions is a method, comprising steps of providing a plurality of access clusters, each including an access switch; providing a plurality of network-edge switches; coupling the network-edge switches to the access switches over a plurality of links; running a spanning tree algorithm to select, for each access switch, a network-edge switch; configuring each of the plurality of access switches to communicate with its selected network-edge switch, independently of the other ones of the plurality of network-edge switches; detecting a failure of one of the plurality of links or a failure in one of the plurality of network-edge switches, identifying which access switch is affected by the failure, running the spanning tree algorithm to select a new network-edge switch for the affected access switch and configuring the affected access switch to begin communicating with the selected new network-edge switch.

A step may be carried out of configuring the selected new network-edge switch to communicate with more than one access cluster. The access clusters providing step may be carried out with each access cluster including a plurality of computing hosts, each computing host including at least one processor and a network interface card (NIC), the NIC being coupled to the access switch. Each of the plurality of access switches may include a Media Access Control (MAC) switch and each of the plurality of network-edge switches may include a network-edge MAC bridge. Each of the plurality of access switches may include a router and each of the plurality of network-edge switches may include a network-edge router.

The foregoing embodiments are only representative and exemplary in nature. Other embodiments become apparent upon further study of the detailed description to follow.

BRIEF DESCRIPTION OF THE DRAWINGS

To facilitate a fuller understanding of the embodiments of the present inventions described herein, reference is now made to the appended drawings. These drawings should not be construed as limiting the present invention, but are intended to be exemplary only.

FIG. 1 illustrates a networked computer system, including a computing host coupled to a network through an Ethernet link;

FIG. 2 shows a networked computer system, including a computing host coupled to a network 44 through two Ethernet links;

FIG. 5 b illustrates a subset of the access cluster 200 of FIG. 5 a, including only a single computing host 202, according to further embodiments of the present inventions;

FIG. 5 c illustrates a further subset of the access cluster 200 of FIG. 5 a, according to still further embodiments of the present inventions;

DETAILED DESCRIPTION

Figure 3:
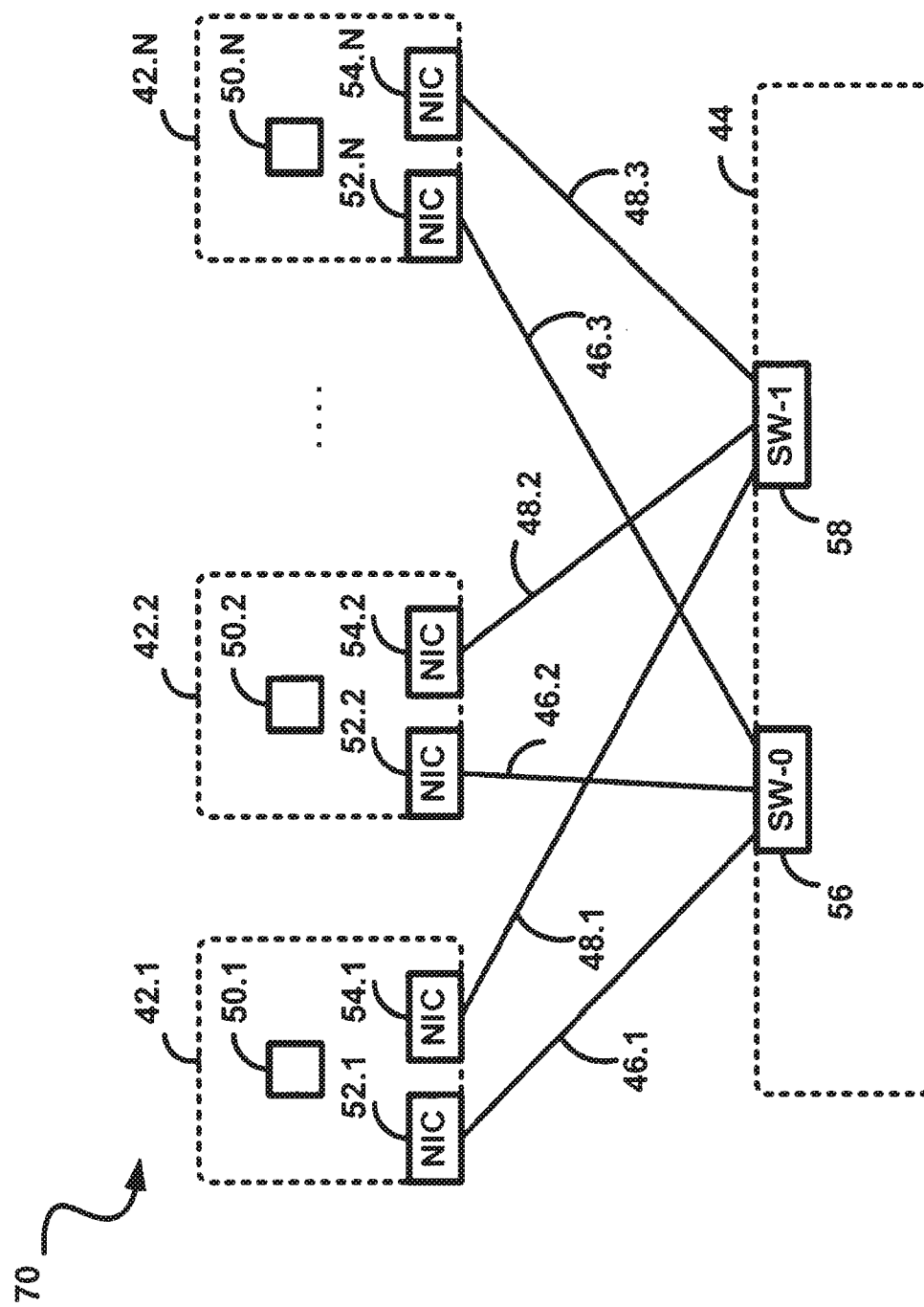
FIG. 3 shows a duplex network connection arrangement that is a generalization of the networked computer system of FIG. 2.

A computing host may communicate with other computing hosts, storage devices, etc. over networks through host side devices that are commonly referred to as network interface cards or NICs.

FIG. 1 illustrates a basic networked computer system 10, including a computing host 12 coupled to a network 14 through an Ethernet link 16. Within the context of the present inventions, a computing host may include, without limitations, one or more Central Processing Units (CPUs), one or more Network Interface Cards (NICs) and associated memory. The computing host 12 includes a CPU 18 and a NIC 20, the NIC 20 being coupled to the CPU 18 through a host bus 22. The network 14 may include switch 24. Indeed, the switch 24 may comprise, for example, a layer-2 switch such in the case of the Ethernet standard, a layer-3 switch such as a router or any oilier type of network switch. The network 14 may be coupled to one or more other computing hosts and to other networks, not shown, and may include more than one switch. The Ethernet link 16 carries traffic between the NIC 20 of the computing host 12 and the switch port 22 of the network 14 which may be considered an edge of the network 14. Other configurations are also common.

In many applications where high reliability is required, the most basic networked computer system 10 is insufficient. For example, a failure of any one of the NIC 20, the Ethernet link 16 or the switch port 22 would cause the computing host 12 to be isolated from the network 14. Therefore, duplication of resources is commonly used in order to improve system reliability.

FIG. 2 shows an example of a networked computer system 40, including a computing host 42 coupled to a network 44 through two Ethernet links 46 and 48 (E0 and E1 respectively). The computing host 42 includes a CPU 50 and two NICs 52 and 54 (NIC-0 and NIC-1 respectively), the NICs 52 and 54 being coupled to the CPU 50. The network 44 may include two (layer 2, layer 3 or hybrid) switches 60 and 62 (SW-0 and SW-1 respectively). The network 44 may be similarly coupled to one or more other computing hosts and to other networks, not shown, and may include one or more switches. The Ethernet link E0 (46) carries traffic between the NIC-0 (52) and a port 56 on switch (60). Similarly, the Ethernet link E1 (48) carries traffic between the NIC-1 (54) and a port 58 on switch (62). However, it is also common that both Ethernet links (E0, E1) connect to ports on the same switch (a switch may have more than one port), for example, if the network includes only a single switch.

It is apparent that reliability may be enhanced in the networked computer system 40 shown in FIG. 2, as compared to the most basic networked computer system 10 shown in FIG. 1. By virtue of the duplication of resources, data connectivity between the computing host 42 and the network 44 is not lost by failure of any one of the connecting elements (e.g., the NICs 52 and 54, the Ethernet links E0 and E1, switch ports 56, 58 and switches (60, 62). Typical examples of specific NICs as shown in FIG. 1 and FIG. 2 are Gigabit Ethernet NICs.

As shown in FIG. 2, multiple NICs may be used to provide network access redundancy for a computing host through teaming of these NICs. In effect, the computing host is coupled to multiple access points to the network. This scheme forces the computing host (its hardware and its software) to understand and to manage all aspects of this redundancy scheme. Although apparently simple in concept, it has been realized that such a network access fault tolerance scheme is, in fact, complex to implement and costly, notably in terms of the increased costs associated with system setup, configuration and maintenance. This situation is further aggravated by the fact that teaming functionality is not uniformly defined or uniformly provided by all operating systems. First, there are several prevailing different NIC teaming protocols. Second, the provider of the teaming function varies amongst different operating systems. These differences bring about many difficulties and complexities to system management, and ultimately increase the total cost of ownership. The following explores these difficulties in more detail.

Network access redundancy is a key element of any computing host deployment in data centers that require a high degree of reliability and availability. Until now, network access redundancy for computing hosts has been typically achieved by providing multiple NICs as shown in FIG. 2. Each NIC usually provides one unicast MAC address to the computing host (although NICs can support multiple MAC addresses), which can be further associated with one IP address. In order to guarantee network access upon failure of the access path (NIC, network link, Switch port, Switch), more than one NIC is provided such that the NICs may be coupled to the network by multiple links and switch ports. The idea is that the computing host, upon failure of any part of the access path (NIC, network link to the network, switch port) can switch to use a different network link into the network. Conceptually, the provision of multiple NICs, network links and multiple switches in the network protects the computing host's connectivity with the network against single points of failure. In reality, the present inventors have come to the realization that protecting the computing host's connectivity with the network by providing multiple NICs, network links and switches is, in fact, a more costly and potentially ineffective protection scheme than might otherwise be thought. First, the switch is typically coupled to multiple computing hosts and failure thereof necessarily affects the operation of multiple computing hosts. Second, a failure of the NIC is frequently accompanied by the failure of the computing host coupled thereto, because of the tight coupling of the computing host to the failed NIC. For example, a bus write failure to the NIC device by the computing host software is generally unrecoverable, and usually results in a total failure of the computing host.

FIG. 3 shows a duplex network connection arrangement 70 which is a generalization of the networked computer system 40 of FIG. 2. As shown, the duplex network connection arrangement 70 includes N computing hosts 42 (reference numerals 42.1, 42.2 . . . 42.N) coupled to the network 44. Each computing host 42.*i* (i=1 to N) includes a CPU 50.*i*, and is coupled to two NICs 52.*i* and 54.*i* through two links 46.*i* and 48.*i* to the two switches (SW-0) referenced at numeral 56 and switch (SW-1), referenced at numeral 58. Switches 56 and 58 are multiport switches, although the ports of each switch are not shown in FIG. 3, for clarity of illustration. Conceptually, this arrangement looks simple and straightforward; that is, two NICs (52.*i* and 54.*i*) for each computing host 42.*i* are teamed together to provide network access redundancy. In reality, however, the present inventors have identified a number of complications, of which a representative five are enumerated below:

1) Each computing host 42.*i* is responsible for selection of the active link (either 46.*i* or 48.*i*) and detection of any eventual failure of that active link. The determination of operability of a link is a rather complex job. Indeed, many implementations only rely on the local link status at the physical layer provided by the NIC hardware. But a good physical link status does not guarantee that traffic can actually flow properly across the link. Furthermore, there may be a problem with the network path beyond the coupled switch port which would break connectivity with the network, even if the link between the NIC and the switch port is working.

2) NIC teaming functionality is not uniformly provided across operating systems. For instance, in the Windows® operating system of Microsoft Corp. of Redmond Wash., NIC teaming is provided by individual device drivers in a device specific way and not by the operating system itself. As a result, the teaming modes provided and the manner in which such modes are to be configured depends entirely on the physical NIC devices being used. In some other operating environments such as, for example, VMWare® of VMWare, Inc. of Palo Alto, Calif., NIC teaming is integral to the operating system functionality.

3) There are a number of prevailing teaming, load balancing and fault recovery modes from which the system administrator may select, but none are uniformly provided. The selected NIC teaming mode affects how the NIC works, the network topology external to the computing hosts, and the manner in which the NICs are configured on the computing hosts themselves. The following is a sampling of some of the available teaming modes to illustrate the diversity and their implications: note that in a cluster of compute resources where multiple operating systems are used (e.g. Windows, VMware, Linux) the configuration is even more complex.

Floating MAC address: In this mode, there is a single active MAC address used by either NIC of the computing module. Only one NIC is being actively used at any time. Link status detection and selection are local to the computing host. The problems with this mode include limited fault coverage of local link status detection, requirement that both external MAC bridges be on the active Ethernet topology at the same time, and MAC location change within the network in case of link failure.

Independent MAC addresses for both NICs: In this mode, each NIC has its own MAC address. Either a single IP address or two IP addresses may be associated therewith. When using a single IP address, the dynamic IP address to MAC address binding can be problematic. When using two IP addresses, the redundancy scheme is exposed all the way to the applications. Most applications can only use a single IP address and are not designed to handle network redundancy themselves.

Ethernet link aggregation: This mode of operation as defined by IEEE 802.3ac allows multiple links to appear as a single link to the computing host and allows traffic to be spread over the links for load balancing purposes, while providing link failure protection. However, link aggregation is defined for use between two end points. As a result, it does not serve the purpose of external switch redundancy. Some proprietary offerings allow computing hosts to be coupled to ports on two separate switches. This gives an appearance that fault tolerance of the external switches is provided. In reality, these implementations have to identify both switches to the computing host with a single system ID (to appear as a single end point by IEEE 802.3ac standard). As a result, they cannot tolerate all failure modes of these duplicate switches (for example, it is difficult to cover failures in inter-communication between the two switches).

4) With a single computing host, different services and applications may impose their own teaming mode requirement (for example, network file systems such as NetApp of NetApp, Inc. of Sunnyvale, Calif.). This complication results in multiple independent groups of teaming and possibly taking different modes of operation, with each group serving one purpose. Consequently, more than one group of NIC devices with more than one NIC device per group is required, and system configuration and management become much more complex.

5) For installations where separate NICs are required to access different networks, for security reasons, each such separate NIC may require its own redundant counterpart. This increases the number of NICs required as well as the number of ports on the external switches The above is but an incomplete list of complications associated with NIC teaming. Because NIC teaming is part of the computing host itself, it has been found that this places a great burden on the system configuration and management of the computing host and that NIC teaming is an inherently error prone method of increasing the reliability of the computing host's access to the network.

Figure 4:
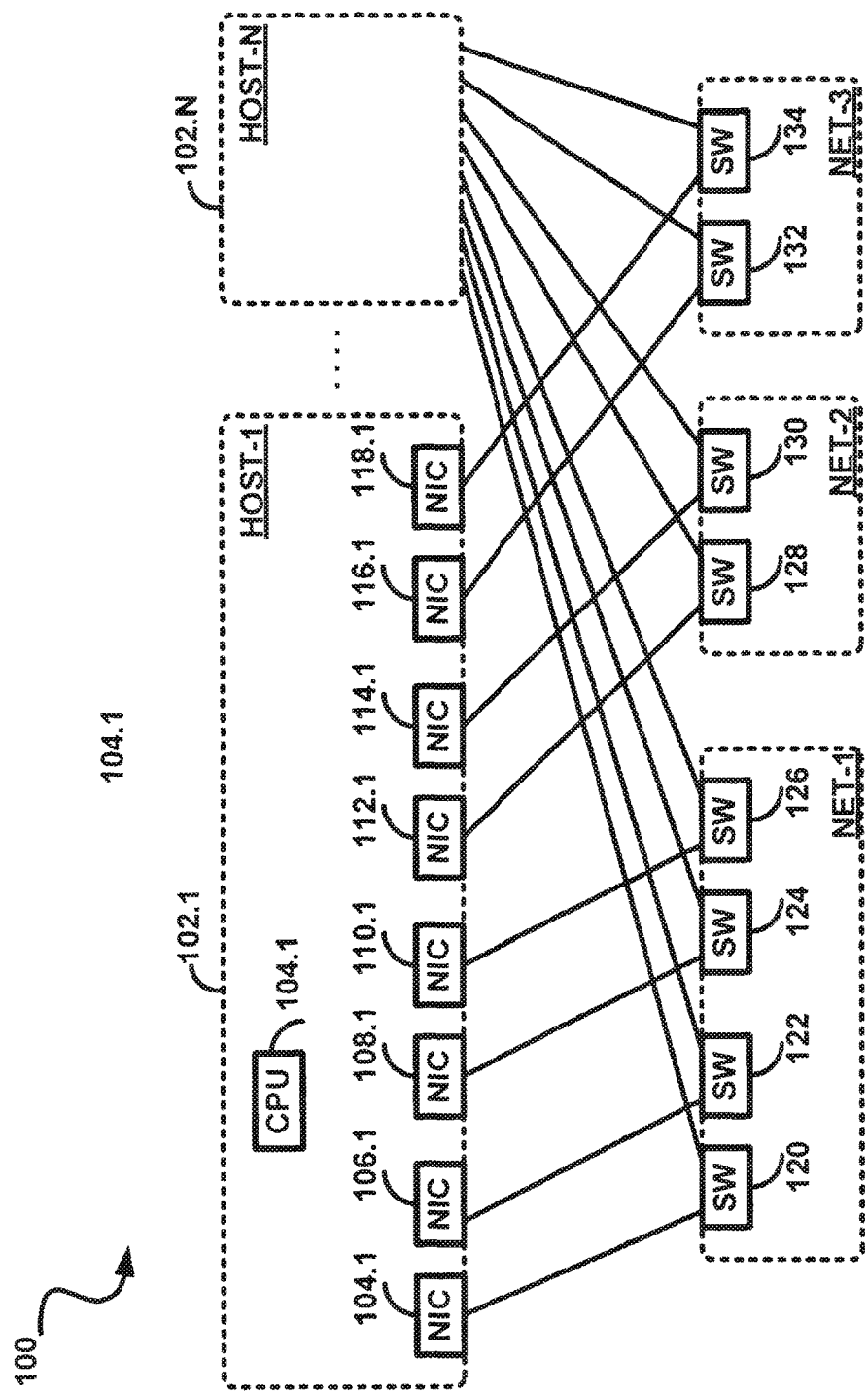
FIG. 4 shows a database server system, illustrating the complex topology that may arise from the use of teaming to provide redundancy.

FIG. 4 shows an example of a database server system 80, to further illustrate the complex topology that may arise from the use of NIC teaming to provide redundancy. The database server system 100 comprises N computing hosts 102.*i* (i=1 to N), and three networks NET-1, NET-2, and NET-3. Not shown are storage and client devices, which would be coupled to one or more of these networks. For example, the first network NET-1 may be used to provide connectivity to local storage devices and to the maintenance system, the second network NET-2 may be the communications network for the customers of the database server system 100 and the third network NET-3 may be a remote storage network. Each computing host 102.*i* includes one or more CPUs 104.*i*, and eight NICs 104.*i*, 106.*i* . . . 118.*i*, with each NIC coupled to one of four separate switch ports of multiport switches 120-126 in NET-1, to one of two switch ports of multiport switches 128 and 130 in NET-2, and to one of two switch ports of multiport switches 132 and 134 in NET-3. From inspection of this topology, it is apparent that the computing hosts 102.*i* coupled to the multiple NICs (eight in this example) each must resolve at least the above-enumerated five complications associated with the use of teamed NICs. An even greater number of NICs may be required, depending on the type of operating system and application software of each computing host.

In view of the above-detailed disadvantages, the present inventors have come to believe that novel solutions are needed to provide reliable and cost-effective network access redundancy, as well as to reduce the initial capital outlay and the ongoing cost of ownership. Accordingly, aspects of the present inventions are predicated upon the identification of the above-detailed disadvantages, complications and inefficiencies of current implementations of NIC teaming schemes. Embodiments of the present inventions, therefore, enable fault tolerant network connectivity without the need for teaming of pairs of NICs to transparently provide the computing hosts with robust, reliable and redundant network connections. Embodiments of the present inventions also provide the ability concentrate bandwidth to higher bandwidth links, shared use of management and traffic data and more efficient use of the installed cabling infrastructure, among other benefits such as load balancing, route selection and failover switching. The computing host itself (its hardware and software) is relieved of the duty of managing network access redundancy and is only tasked with the managing the simple, simplex networking operating mode. According to embodiments of the present inventions, the network access redundancy may be provided through one or more switches. The switch(es) may be or include a layer 2 switch included in or otherwise associated with the computing host, which switch presents a single point of access to the computing host while providing redundant access to one or more networks at its backend. Alternatively, the switch(es) may be or include a layer 3 switch such as a router. Within the present application, it is understood that the term "switch" expressly encompasses layer 2 switches, layer 3 switches and/or other hybrid devices that combine layer 2 and layer 3 switching functionality.

The switch (e.g., a layer 2 switch or a router or a hybrid) generally includes the ability to run a standard spanning tree algorithm (e.g., STP, RSTP or MSTP) or other routing protocols (such as, for example, layer 3 ECMP (Equal Cost Multi Path) routing), and allows one or more spanning trees to be formed and reconfigured in case of network failure, for fault tolerant network access.

A computing host, may include a self-contained computer, meaning that it may be booted and operated independently of any other such host. A computing host, as noted above, may include one or more CPUs, one or more NICs and associated memory. The computing host may be loaded with a single operating system image. In a virtualized environment, one or more guest operating system images may be simultaneously loaded and operating.

Figure 5A:
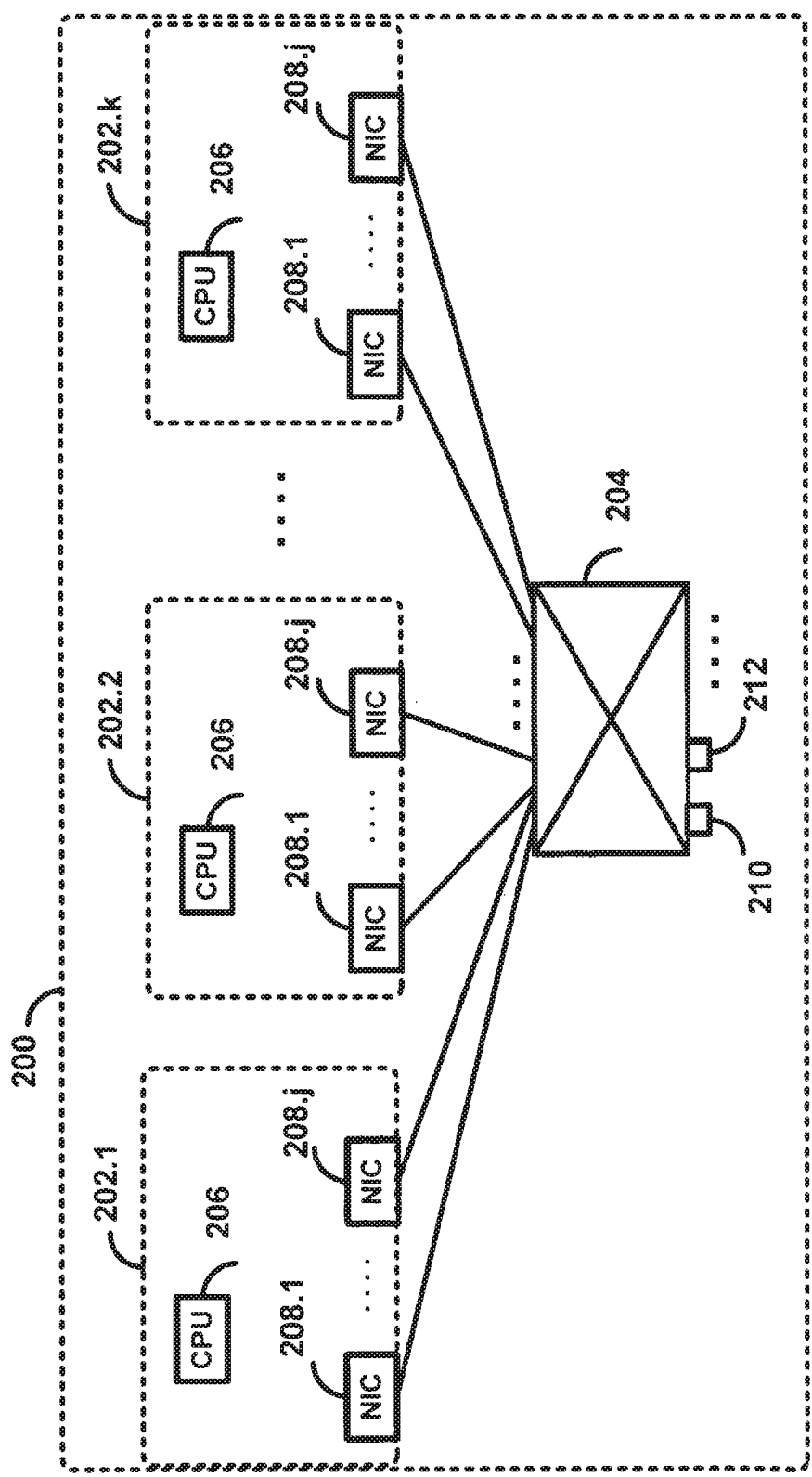
FIG. 5 a shows an access cluster, including one or more computing hosts and a switch, according to an embodiment of the present inventions.
Figure 5C:
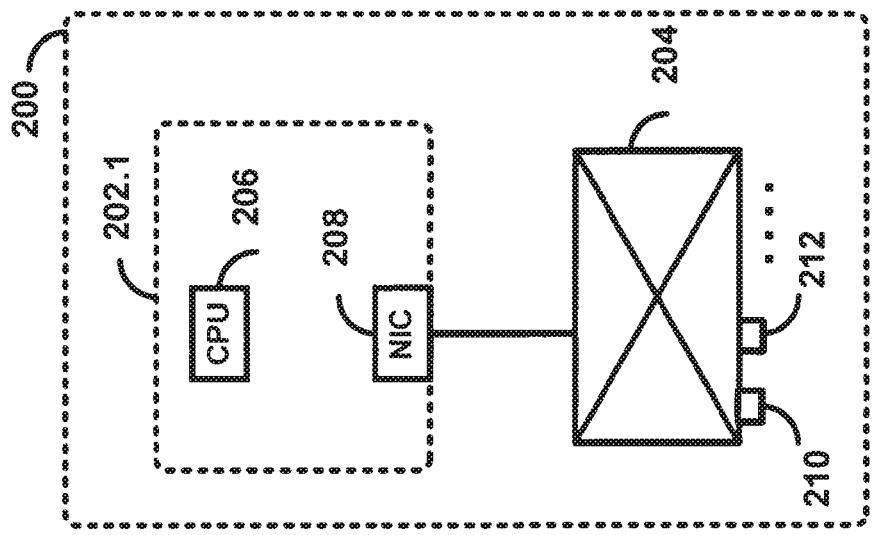
Figure 5B:
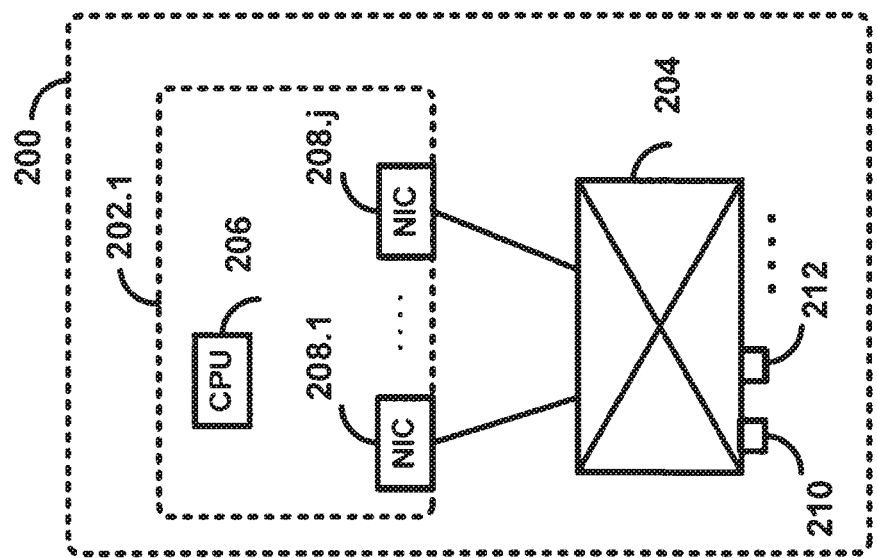

FIG. 5 *a* shows an access cluster 200, including one or more computing hosts 202.*j* (j=1 to K) and an access switch 204. Within the context of the present inventions, the term "access switch" denotes a switch that is used to access a network. Thus, the term "access switch" is not intended to denote a specific kind or type of switch, but merely its place and/or functionality within the network topology. Thus, an "access switch" is a switch that is associated with a computing host and is used to access a network. Each computing host 202.*j* may include (without limitation) one or more CPUs 206.*j* and one or more NICs 208.*j*. Although only one CPU 206.*j* is shown in FIG. 5 for simplicity, it is understood that each computing host 202.*j* may include more than one CPUs as well as CPUs with multiple CPU-cores. The processors could be separate or could be associated with each other through SMP or NUMA mechanisms. Each NIC 208.*j* is coupled to the access switch 204.

Although only a single NIC 208 is required in each computing host 202.*j*, each computing host 202.*j* may include or may be coupled to more than one NIC. Such additional NICs may be used for increasing bandwidth, accessing different VLANs, providing multiple IP addresses, etc. However, according to embodiments of the present inventions, multiple NICs are not used for the purpose of network access redundancy, and when multiple NICs are used in the computing host 202.*j*, they are not teamed as described above for the purpose of network access redundancy. In general, the links between the NICs and the switch 204 are configured to carry traffic from multiple different types of networks.

The access switch 204 will work with a single link but may include at least two network-side ports 210 and 212 for redundant network access. It is to be noted that the network-side ports 210 and 212 are identified as being "network-side" only for the purpose of explaining network topology, not to indicate any structural difference with other ports, such as the ports coupling the switch 204 to the NICs, for example. Although only two network-side ports (210 and 212) are shown in FIG. 5, the access switch 204 may be provided with additional network-side ports for the purpose of increasing bandwidth, accessing different networks, etc. In operation, each computing host 202.*j* sees one non-redundant switch, and the access switch 204 is responsible for managing redundant network access and load balancing across those links.

As shown in FIG. 5 *a*, according to an embodiment of the present invention, the access cluster 200 may include one or more computing hosts 202.

FIG. 5 *b* illustrates a subset of the access cluster 200 of FIG. 5 *a*, including only a single computing host 202, together with the access switch 204, according to another embodiment of the present inventions. The computing host 202 may include multiple NICs 208.1 to 208.*j*, each NIC being coupled to the access switch 204 with a separate link. The separate links may carry traffic from one or more different types of networks.

FIG. 5 *c* illustrates a further subset of the access cluster 200 of FIG. 5 *a*, including only a single computing host 202, together with the access switch 204, where the computing host 202 includes only a single NIC 208 coupled to the access switch 204, according to yet another embodiment of the present inventions. It is to be noted that, within the context of the present embodiments, computing hosts may include a single or multiple processors. Also, one or more NICs may be combined with one or more switches to form a single physical device, in this and the other embodiments.

The actual configuration of the access cluster 200 may be selected as a tradeoff between lowering equipment cost as a result of sharing the switch, and the quanta of loss that would be associated with a single point of failure. This can be different for individual deployment, and may change over time as technology price/performance evolves.

Figure 6:
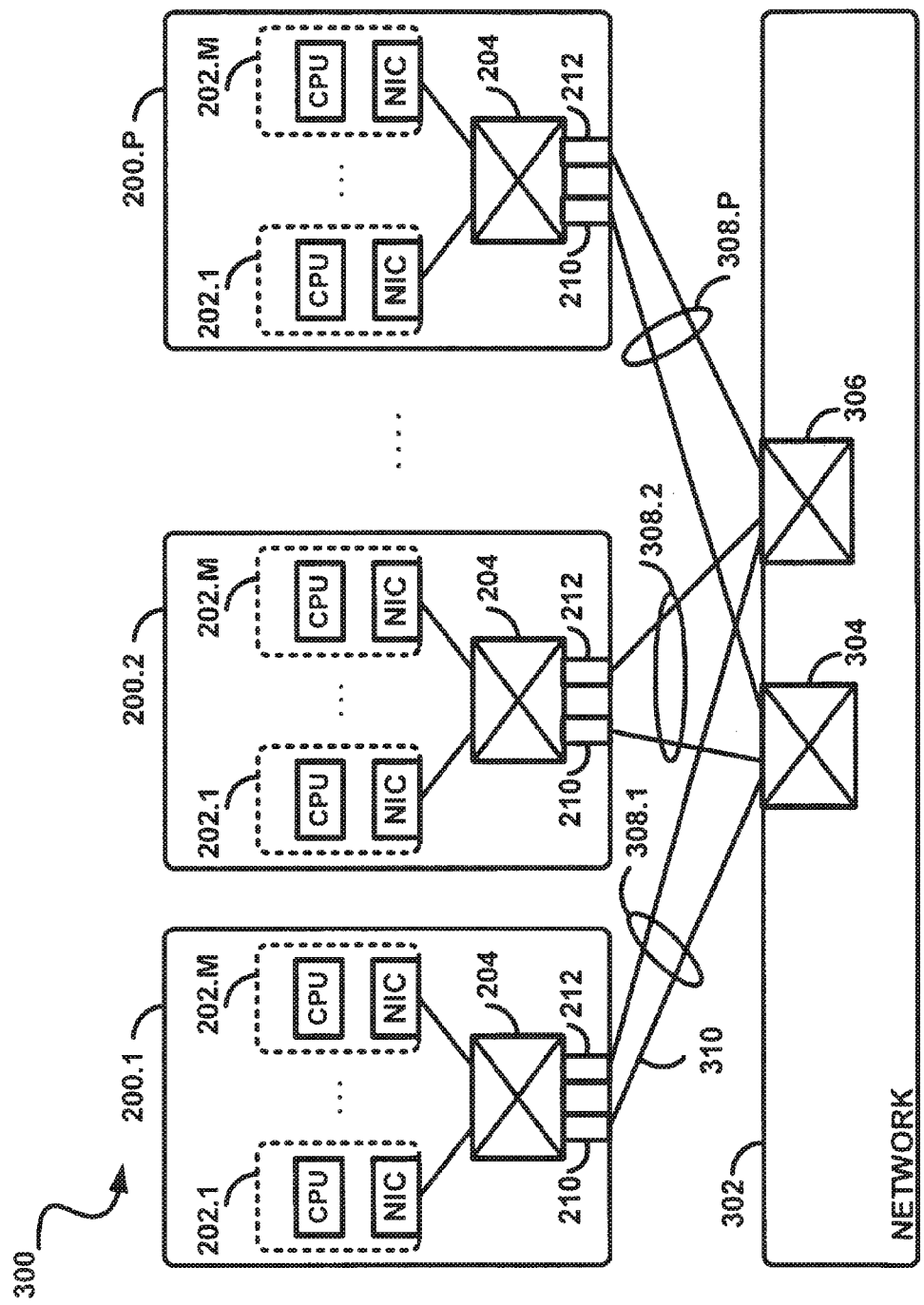
FIG. 6 shows an embodiment of a first system, including a number P instances of the access cluster of FIG. 5, and a network, according to embodiments of the present invention.

FIG. 6 shows a system 300 according to embodiments of the present inventions. As shown, the system 300 may include P instances of access cluster 200 and a network 302, the instances of the access cluster 200 bearing reference numbers 200.1 to 200.P. The network 302 may include, as shown in FIG. 6, two network-edge switches 304 and 306.

Within the context of the present inventions, "network edge switch" denotes a switch that is disposed at the edge of a network and allows access to that network by external devices. Therefore, the "network edge switch" nomenclature is not indented to denote a specific type of switch, but suggest its place and/or functionality within the network topology. Each access cluster 200.$k$ ($k$=1 to P) may include the one or more computing hosts 202.$j$ ($j$=1 to M), and an access switch 204 with the at least two redundant network-side ports 210 and 212, as described above (although the access switch 204 may be configured with only a single network-side port).

Each access cluster 200.$k$ ($k$=1 to P) may be coupled to the network 302 through a corresponding pair 308.$k$ of links 310. The links 310 may be serial links, but other types of links may also be employed. Each link 310 of a pair 308.$k$ couples a distinct one of the network-edge switches 304 and 306 of the network 302, to the access switch 204 of the corresponding access cluster 200.$k$ on its network-side ports 210 and 212 respectively. As noted earlier, additional network-side ports may be provided, and, although only two network-edge switches 304 and 306 are shown in this exemplary embodiment, the network 302 may include additional network-edge switches for coupling to the additional network-side ports through additional links 310. Furthermore, while the pair 308.$k$ of links 310 between each access cluster 200.$k$ and the network 302 shown in FIG. 6 is sufficient for providing diversity and correspondingly increased reliability, additional network-edge switches and additional links (to the same or a different switch) may also be employed in the present embodiments, for increased bandwidth or redundancy, for example.

Each access cluster 200.$k$ may advantageously be implemented as a single field replaceable unit such as a single assembly for a slot in a system chassis or further modularized. According to a further embodiment of the present inventions, a layer 3 switch (such as a router, for example) or hybrid switch may be substituted for one or more of the access switches 204, to provide additional routing capabilities. An example of an L3 switch is a router that uses L3 protocols for path selection, load balancing, and failover to avoid broken links.

The topology of nodes shown in FIG. 6 provides the physical connectivity that ensures that each computing host 202.$j$ of every access cluster 200.$k$ can reach the network 302 over at least one of the links 310, even under failure conditions. The methods by which redundant links are selected, according to embodiments of the present invention, are described herein below.

According to an embodiment of the present inventions, an innovative method that may be entitled "Dynamic Link Selection Using Spanning Tree Algorithms" is detailed herein to handle link selection, including failure recovery. Embodiments of this method are at least partly based on the premise that the network-edge switches 304 and 306, the access switches 204, and the links 310 form an Ethernet Local Area Network (LAN) that is capable of running a spanning tree algorithm.

As is known, an Ethernet LAN can only work on a loopless topology, where there is a unique path between any pair of endpoints. For network redundancy, a LAN usually takes on a physical topology that has at least one redundant path between a pair of endpoints for fault tolerance. It is apparent that such a topology contravenes the basic Ethernet LAN operational requirements of Ethernet LANs, as the redundant paths form loops between pairs of endpoints. Spanning tree protocols are protocols that enable the network topology to be discovered and automatically configured to prevent undesirable loops between pairs of endpoints in the network while permitting physical redundant paths that can be used in the event of failure of the active path.

Distributed spanning tree algorithms have been widely used to dynamically configure the physically redundant network into an active loopless topology for real-time operation. This is typified by the spanning tree algorithm defined in the IEEE 802.1D standard. The initial version of the 802.1D standard defines an algorithm (the Spanning Tree Protocol, STP) that constructs a single spanning tree out of the physical network. Performance improvements (e.g., Rapid Spanning Tree Protocol, RSTP) were introduced later in the IEEE 802.1w standard.

Commercially available L2 switches generally include a spanning tree protocol capability, for example. Details of spanning tree implementations are available from a number of sources, for example "LAN/MAN Standards Committee of the IEEE Computer Society" ed. 2004, ANSI/IEEE Std 802.1D-2004: IEEE Standard for Local and Metropolitan Area Networks: Media Access Control (MAC) Bridges, IEEE, which is incorporated herein by reference in its entirety.

To facilitate a better understanding of aspects of the present inventions, the basic principle of the spanning tree algorithm is briefly summarized in the following high-level description.

Switches are nodes with ports that are inter-coupled by (Ethernet, in the case wherein the switches operate with L2 protocols) links to form a network. The nodes are numbered with unique node identifiers (node id), and each link is associated with a port path cost value that may be a function of bandwidth or length. For example, the port path cost may be inversely proportional to bandwidth, such that higher bandwidths and shorter length correspond to lower port path costs. The port path costs are attributed as port path costs to the ports to which a link is coupled. Each node periodically exchanges information with its neighbors over all working links and computes the spanning tree from information regarding the entire network obtained in this way. After deciding on a "root node" (e.g. the switch with the lowest numbered node id), a minimum spanning tree is computed, i.e. for each node pair in the network, the lowest port path cost is chosen. Each node then marks each of its own ports as "forwarding" if it is on any lowest cost path, and as "blocking" if it is not. A port priority number (which is configurable) is used to resolve ambiguity and may be used for other purposes. After computation is finished, the spanning tree ensures that the links connecting "forwarding" ports form a loop-less tree, and all other links are "blocked", i.e. do not carry ordinary data traffic although all ports continue to participate in the node-to-node information exchange. If a link (or node) should fail, all (remaining) nodes in the network will learn of the failure in short order, and will compute a new spanning tree based on the working nodes and links.

Also commonly used, virtual LANs (VLANs) can provide a logical and address segmentation of a LAN for several groups of computing hosts sharing a physical Ethernet network. The virtual LAN (VLAN) standard is defined in the IEEE 802.1Q standard. A protocol for multiple spanning trees (MSTP) was defined in the IEEE 802.1s standard and merged into IEEE 802.1Q-2003 VLAN standard. MSTP allows different VLANs to use different spanning trees over a common physical Ethernet network. Two methods of creating and maintaining multiple spanning trees may be practiced. According to a first method, each spanning tree instance may be created and maintained by a separate instance of spanning tree algorithm. One or more VLANs may then be associated with each spanning tree instance. According to a second method (standardized by IEEE), a single multi spanning tree algorithm may be created, which creates and maintains multiple instances of spanning trees. The algorithm and protocol are integrated with regard to the different instances of spanning trees. As before, one or more VLANs may be associated with each spanning tree instance. The IEEE 802.1q protocol standardized a multi-spanning tree algorithm allowing for up to 64 spanning tree instances to be created and maintained while a maximum of 4096 VLANs may be established over all spanning tree instances combined. Embodiments of the present inventions expressly support both methods of creating and maintaining multiple spanning trees.

A major drawback of the single spanning tree paradigm is that many existing physical links are disabled (associated ports are blocked) by the spanning tree algorithm and in some sense wasted. With multiple spanning trees, different VLANs may make use of different spanning trees. Each VLAN still sees a spanning tree but all physical links may be utilized, though in different VLANs.

According to embodiments of the present inventions, any version of spanning tree algorithms may be used to construct a loop-less topology, in particular, in relation to the connections between the access switches and the network-edge switches. As a result, a computing host in each access cluster is automatically provided with network access redundancy by the spanning tree mechanism, but this is transparent to the computing hosts which are not themselves involved in the spanning tree computations.

This allows the computing host to:

(a) reduce the number of NICs required: no extra NICs are needed simply for the purpose of network access redundancy; In FIG. 6 (database server example) the number of NICs drops from eight to four or less. The number of NICs could be four if the application required four physical NICs but if the physical NICs are just used to access the three physically separate networks, then the number of NICs could drop to one;

(b) reduce the number of ports on the network side. For example in FIG. 6, eight network edge ports are required. With the access switch only two network edge ports are required;

(c) avoid the need for software to be aware of, and/or to directly handle, network access redundancy (thereby correspondingly reducing processor overhead);

(d) simplify system configuration as redundancy is not required in the computing host configuration;

(e) have a uniform configuration methodology regardless of the hardware NIC devices used;

(f) have a uniform configuration strategy regardless of the operating systems used;

(g) have a uniform redundancy strategy for multiple network access;

(h) simplify cabling. For example, multiple NICs may be aggregated through the access switch and emerge on two ports. If extra throughput is needed, the access switch can provision the network facing ports with higher bandwidth links (e.g. 10 Gb/s instead of 1 Gb/s). In the example of FIG. 6, the number of cables drops from 8 to 2;

(i) improve performance as computing host software no longer plays a role in the network redundancy management, and (j) improve provisioning of network resources for load balancing.

As noted above, the spanning tree algorithm can automatically construct an active topology that is loop-less and that reaches every endpoint. In this process, some physically existing links may have to be blocked. In the context of a collection of computing hosts coupled to a network, such as exemplified by the access clusters 200.$k$ coupled to the network 302 (FIG. 6), each network-edge switch (304 or 306) may be coupled to a relatively large number of access clusters 200 while its connections to the rest of the network will have usually less bandwidth than the combined bandwidth of the links 310 to the access clusters 200.$k$. In this case, the network-edge switches 304 and 306 not only serve as network access points for the access clusters 200.$k$ but also serve to aggregate traffic for them. Computer network traffic may be generally characterized as bursts of heavy activity, with relatively lighter traffic between consecutive bursts. Consequently, each network-edge switch 304 or 306 does not need to provide bandwidth to the rest of the network 302 that equals the sum of the maximum bandwidths for all the access clusters 200.$k$. However, it is preferable that all of the network-edge switches 304 and 306 can be simultaneously used to provide the maximum possible bandwidth when there is no failure. According to embodiments of the present inventions, the spanning tree algorithm may often operate such that only one of the two or more network-edge switches 304 and 306 is actually used in carrying traffic at any given time.

Embodiments of the present inventions further introduce a methodology to allow all of such network-edge switches (i.e. 304 and 306) to be used in providing maximum bandwidth support when there is no failure. The network-edge switches may advantageously be configured to automatically continue to support all access clusters 200.$k$ at a degraded bandwidth only when there is a failure.

A number of different possible failures of embodiments of the present inventions are described:

failure of a computing host 202.$j$ or an access switch 204 in an access cluster 200.$k$ is considered to be a failure of the (field replaceable) access cluster 200.$k$ and simply requires repair of the failed component, no automatic failure recovery is attempted;

failure of an active link 310 of a pair 308 causes the spanning tree algorithm to select another link 310;

failure of one of the network-edge switches 304 or 306 causes the spanning tree algorithm to move the traffic from the affected links 308 to the links 308 coupled to the other one of the two network-edge switch 306 or 304 respectively.

As may be appreciated, according to embodiments of the present inventions, the spanning tree algorithm automatically selects a working link and thus recovers any one failure in the redundant parts of the system by selecting an alternate link.

The standard spanning tree algorithm has two parameters that determine how an active link might be selected over other links; namely, port priority and port path cost. The port path cost associated with a link represents the cost of using the associated link. Port priority is primarily used for breaking a tie in the link selection process. In practical use, the port path cost of a link is generally associated with the speed of the link. The IEEE 802.1D standard includes recommendations for the selection of the port priority (a single default value) and the port path cost (default values per link speed of the port).

Embodiments of the present inventions introduce two new parameters in the context of spanning tree algorithm operation; namely, the port priority bias and the port path cost bias. These parameters allow for the partition of the access clusters coupled to the network-edge switches into groups, with each partitioned access cluster group being associated with and actively coupled to only one of the network-edge switches when there is no failure, according to an embodiment of the present inventions. In essence, embodiments of the present inventions provide for each network-edge switch 304 or 306 to be designated to serve one or more access clusters group independently of the other network-edge switch when there is no failure. When a failure occurs, the spanning tree may then be recalculated and a plurality (e.g., more than one) of access cluster groups may then share the same network-edge switch for network access.

Figure 7:
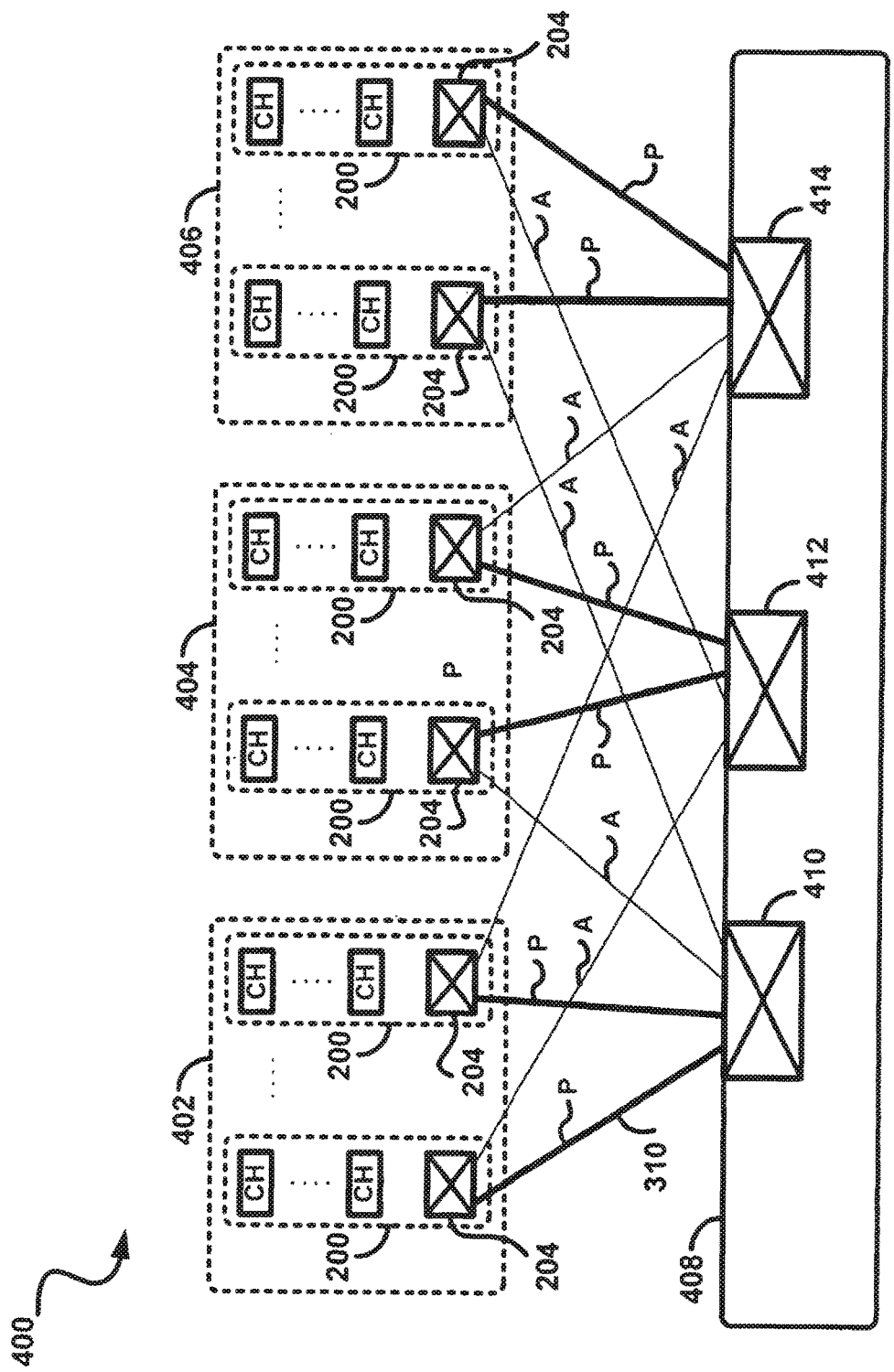
FIG. 7 shows an embodiment of a second system to illustrate the use of port priority bias and port path cost bias, according to embodiments of the present inventions.

FIG. 7 shows a second exemplary system 400 to illustrate the use of port priority bias and port path cost bias in greater detail, according to embodiments of the present inventions. The exemplary system 400 of FIG. 7 includes three access cluster groups 402, 404, 406, each cluster group (402, 404, 406) including a number of access clusters 200. It is to be noted that the grouping of access clusters 200 into access cluster groups 402, 404, 406 is only for convenience and does not have any network significance. For example, the grouping of a plurality of access clusters served by a switch 204 into access cluster groups may denote the grouping thereof into separate mechanical enclosures or may denote arbitrary groupings for ease of reference. In turn, each of the access cluster 200 may include a predetermined or an arbitrary number of computing hosts (CH), and each of the access clusters 200 of each access cluster group 402, 404, 406 may include an access switch 204. Each computing host may include, without limitation, one or a plurality of CPUs, one or more NICs and associated memory. The exemplary system 400 further includes a network 408 which may include a plurality of (in this example, three) network-edge switches 410, 412, and 414. To simplify the illustration, only a small number of access cluster groups, access clusters, and network-edge switches are shown in FIG. 7. The access switch 204 of each access cluster 200 may be coupled to two different network-edge switches via two links 310, a primary link (labeled "P") and an alternate link (labeled "A"), to two different network-edge switches.

As shown, the primary link "P" from each access cluster 200 in the access cluster group 402 is coupled to the network-edge switch 410, while the alternate links "A" are each preferably coupled to a respective one of the remaining network-edge switches 412 and 414. Similarly the primary link "P" from each access cluster 200 in the access cluster group 404 is coupled to the network-edge switch 412, while the alternate links "A" thereof are preferably coupled to the remaining network-edge switches 410 and 414; that is, one to network-edge switch 410 and another one to the network-edge switch 414. Finally, the primary link "P" from each access cluster 200 in the access cluster group 406 is coupled to the network-edge switch 414, while the alternate links "A" are each preferably coupled to one of the remaining network-edge switches 410 and 412. In the exemplary system 400 of FIG. 7, only two access clusters 200 are shown in each access cluster group (402, 404, 406). In general, all access clusters 200 in a given access cluster group (402, 404, 406) preferably would be coupled with their respective primary links "P" coupled to the same network-edge switch, while the alternate links "A" may be coupled to (e.g., spread over, distributed across) the remaining network-edge switches. Other strategies are possible and are considered to be within the scope of the present inventions. For example, simply connecting all alternate links "A" to any one network-edge switch that is different from the network-edge switch to which the primary links "P" are coupled, would not necessarily achieve the same traffic spreading effect but may have other benefits such as a simpler wiring topology.

According to embodiments of the present inventions, for the set of ports (terminating the links 310) on each access switch coupled to the network-edge switches, a base port priority, p, and a base port path cost, c, are selected for a single port. A port priority bias, pb, and a port path cost bias, cb, are also determined. A primary network-edge switch is then selected from the network-edge switches to which it is coupled. Then, for each port of the access switch coupled to a network-edge switch, the port priority and port path cost are selected as follows:

If the port of the access switch is coupled to a network-edge switch by a primary link "P", the base port priority, p, and base port path cost, c, are used respectively.

If the port of the access switch is not coupled to a network edge switch by a primary link "P" but is instead coupled to the network-edge switch by an alternate "A" link, the biases are applied; that is, the selected priority is p+pb and the selected port path cost is c+cb. Note that a small priority value means higher priority, as per IEEE 802.1D.

These rules may be applied to the configuration of the second exemplary system 400 shown in FIG. 7 as follows. For each of the access switches 204 in the access clusters 402, 404, and 406, the network-edge switches 410, 412, and 414, respectively, are selected as the primary network-edge switches, in which the primary network-edge switch of an access switch may be defined that network-edge switch to which the access switch is coupled by a primary "P" link. The primary links in FIG. 7 are shown in a thick line width and are labeled "P", whereas the alternate links are shown using a finer line width and are labeled as "A". As shown, all access clusters 200 of the access cluster group 402 for example, are coupled to the network-edge switch 410 with their primary links "P", making the network-edge switch the primary network-edge switch for the access cluster 402. The alternate links "A" coupled to the ports of the access cluster group 402 distributed over the network-edge switches 412 and 414. Similarly, all access clusters 200 of the access cluster group 404 are coupled to the network-edge switch 412 with their primary links "P", while the alternate links "A" from the access cluster group 404 are spread over to the network-edge switches 410 and 414. Finally, all access clusters 200 of the access cluster group 406 are coupled to the network-edge switch 414 with their primary links "P", while the alternate links "A" from the cluster group 406 are spread over to the network-edge switches 410 and 412.

Assuming that for example all links 310 are of the same bandwidth and carry the same base port path cost c, the addition of the port path cost bias cb thereto (assuming a non-zero value for cb) for the alternate links "A" is sufficient to cause the spanning tree calculation to select the primary links "P" (as a higher port path cost translates into a lower priority for the ports of the access switch coupled to a network-edge switch via an "A" link) when there is no failure, but automatically select the alternate links "A" when either the primary link "P" or the primary network-edge switch fail. This is illustrated in FIG. 8 below.

Figure 8:
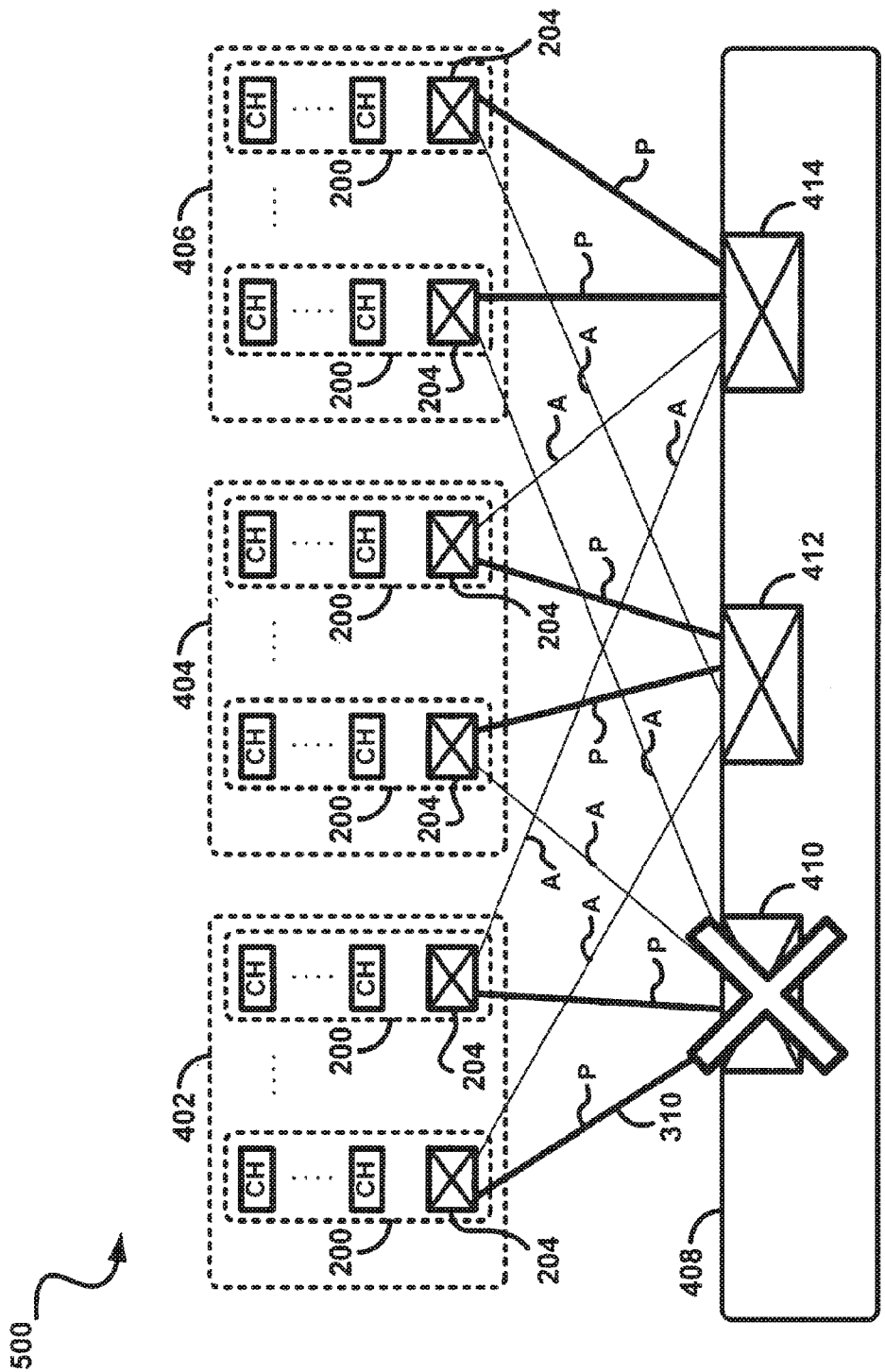
FIG. 8 illustrates a variant of the second system, modified according to further embodiments of the present inventions to show the result of a failure of the network-edge switch port.

FIG. 8 illustrates a copy 500 of the second exemplary system 400, modified to show the result of a failure of the network-edge switch 410. In this event, the primary links "P" 310 from the access cluster group 402 that terminate at the failed network-edge switch 410 become unavailable and will be ignored by the spanning tree calculation (as their port path costs have increased to infinity (or to a very large value) as the BW of the primary links "P" has decreased to zero (or a very small value)). According to an embodiment of the present invention, the spanning tree algorithm then selects and makes active the alternate links "A" 310, drawn with narrow line width lines in FIG. 8 and labeled "A", that connect the access clusters 200 in the access cluster group 402 to the working network-edge switches 412 and 414.

The access clusters 200 in the other access cluster group 404 and 406 are only affected to the extent that their access switches 204 participate in the spanning tree computation.

As shown in FIG. 8, the simple use of a common value for the port path cost bias cb for the alternate links, according to embodiments of the present invention, is sufficient to ensure not only survivability of the connectivity between all access clusters 200 in the cluster group 402 but also to spread the traffic from and to the access clusters 200 whose primary links "P" failed, or whose primary network-edge switch 410 failed, over the remaining network-edge switches 412 and 414. In larger systems with potentially a greater number of access cluster groups and network access switches, more differentiated failure recovery strategies may be designed by choosing different values for the port path cost bias cb for different links. In addition to using the port path cost bias cb for the purpose of differentiating alternate links from primary links, the port priority bias pb, may be similarly used. Numerous other possible strategies for controlling the selection of primary and alternate paths may be devised according to the present inventions by judiciously choosing appropriate values for the port path cost and priority biases, including the possibility of dynamically rearranging the configuration before and after failure scenarios in response to traffic demand.

FIGS. 7 and 8 illustrate only a network using a single spanning tree, according to embodiments of the present invention. As indicated above, the use of VLANs affords another dimension by which two or more virtual networks, each with then own spanning tree, may be overlaid on the same system. Alternate links between "blocked" ports in one VLAN may be primary "forwarding" links in another VLAN, thus keeping all or most links available for traffic. Indeed, the methods disclosed herein may be readily scaled and extended to support multiple spanning trees as defined in IEEE 802.1q. Indeed, according to further embodiments of the present inventions, the use of primary link designation, port path bias and port priority bias as disclosed herein may be extended to multiple VLANS and multiple spanning trees, where each VLAN, over the access switch, may individually select its own primary link, independently of the other VLANs. Therefore, the designated primary link for one VLAN may be different from the link designated as primary by another VLAN. Also, the alternate link of one VLAN may the primary link over which traffic flows in another VLAN. As a result, traffic to and from a single access cluster may flow simultaneously over different links to the network, depending on VLAN identities.

Figure 9:
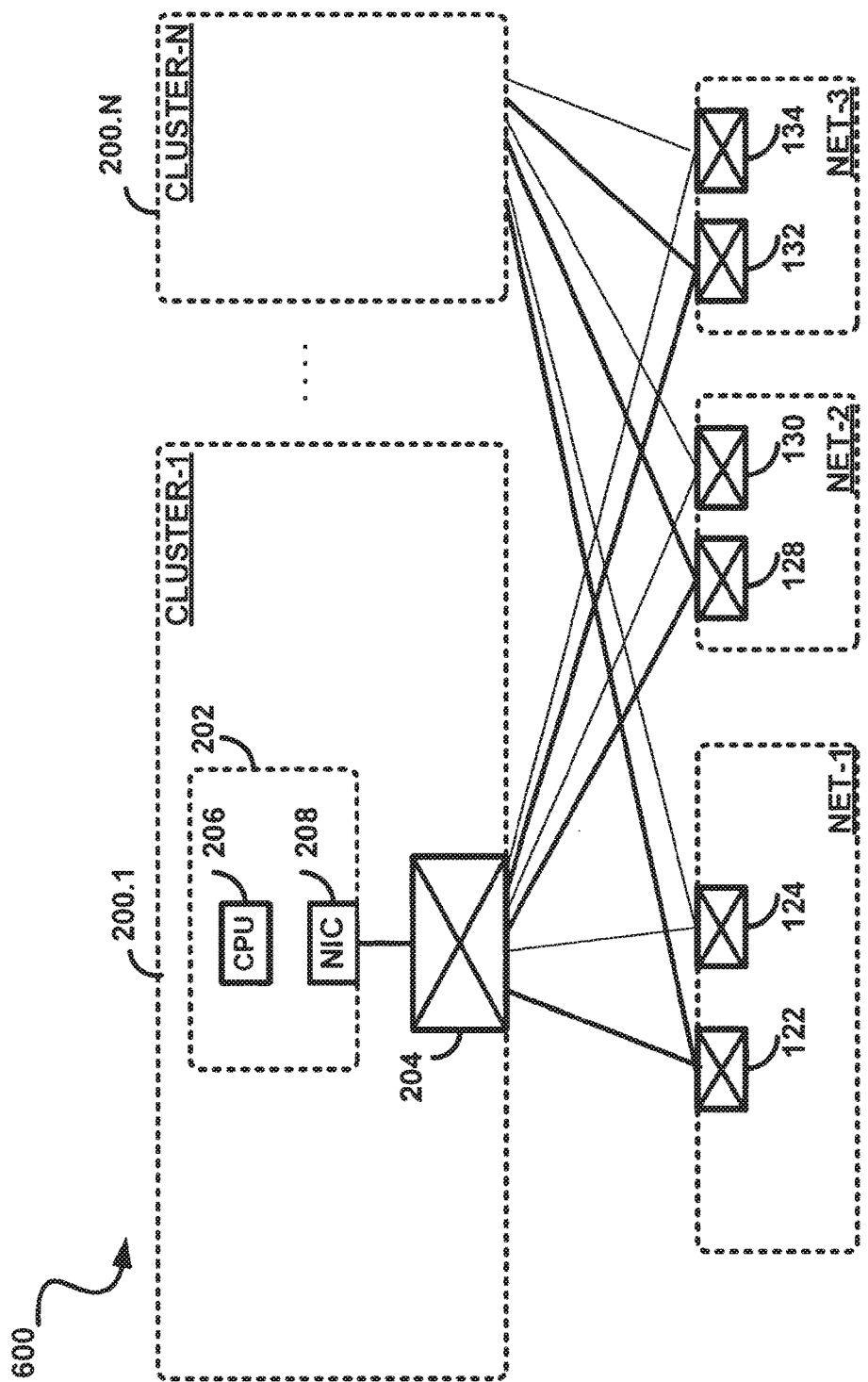
FIG. 9 shows an improved database server system according to embodiments of the present invention.

FIG. 9 shows an example of an improved database server system 600, according to further embodiments of the present invention. The improved database server system 600 may include N instances 200.i, (i=1 to N) of the access cluster 200 of FIG. 5 (each including one or more computing hosts 202 that includes at least a CPU 206 and a NIC 208, and the access switch 204), and three networks NET-1, NET-2, and NET-3, similar to the networks of the same names of FIG. 4. Each access cluster 200.i may be coupled to the two switches 122-124 in NET-1; to the two switches 128 and 130 in NET-2, and to the two switches 128 and 130 in NET-3. Multiple NICs in each access cluster are no longer required to resolve networking issues and redundancy, nor are the even greater number of NICs that may be required as described relative to FIG. 4 to solve operating system and application software incompatibilities that are associated with teaming of NICs. Instead, each computing host 202 of the access cluster 200 requires only a single NIC 208 (although a greater number of NICs may be provided) and the network connectivity is provided through the single access switch 204 in each access cluster 200. The switch 204 need only be coupled to two network edge switches to provide for network access redundancy.

Through the innovative use of the inventions disclosed herein, this topological simplification may result in a significant hardware cost reduction (many NICs replaced by the access switches 204). Likewise, by aggregating multiple NICs in a computing host onto one or more transmission links, the number of costly network ports required is advantageously reduced. Equally or more important is the reduction in software complexity in the computing hosts which are no longer tasked to administer and maintain multiple NICs and NIC teaming modes. The software simplification and associated configuration simplification/automation exhibited by embodiments of the present inventions also directly translates into a cost reduction as the cost of ownership of a system that incorporates an embodiment of the present inventions is likely to be significantly lower than that of prior art systems.

Embodiments of the present inventions are related to the use of one or more computers communicating across one or more networks. According to one embodiment, the computer-implemented methods described herein may be carried out by one or more computer systems in response to processor(s) executing sequences of instructions contained in memory. Such instructions may be read into memory from a computer-readable medium, such as a data storage device. Execution of the sequences of instructions contained in the memory may cause the processor(s) to perform the steps and have the functionality described herein. In alternative embodiments, hard-wired circuitry may be used in place of or in combination with software instructions to implement the claimed embodiments of the present inventions. Within the context of this document, a 'computer-readable medium' may be or include any means that can contain, store, communicate, propagate or transport a program or application that implements an embodiment of the present inventions for use by or in connection with a computerized system, apparatus, or device. Indeed, the computer readable medium may be or include (but is not limited to), for example, an electronic, magnetic, optical, electromagnetic, infrared, or semi-conductor system, apparatus, device, or propagation medium. More specific examples (a non-exhaustive list) of computer-readable media may include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (such as a CD or DVD-ROM, for example) or other data carriers.

While the foregoing detailed description has described preferred embodiments of the present invention, it is to be understood that the above description is illustrative only and not limiting of the disclosed invention. Those of skill in this art will recognize other alternative embodiments and all such embodiments are deemed to fall within the scope of the present invention. For example, in all embodiments, port priority and port priority biases may be used in combination with or in place of port path costs and port path cost biases.

19

Those of skill in this art may devise other such variations. Thus, the present inventions should be limited only by the claims as set forth below.

What is claimed is:

1. A non-transitory computer-readable medium that stores computer-executable instructions that, when executed, cause one or more processors to perform operations comprising:
  running a spanning tree algorithm for a network that includes a first network edge switch, a second network edge switch, and an access switch,
    wherein the access switch has a first network side port coupled to the first network edge switch using a second link,
    wherein the access switch has a second network side port coupled to the second network edge switch using a first link, and
    wherein running the spanning tree algorithm is based at least on a first port path cost and a second port path cost respectively associated with the first link and the second link;
  based upon a result of the spanning tree algorithm, configuring one of the first and second links as a primary link and the other of the first and second links as an alternate link,
    wherein only the primary link is active and enabled to carry traffic until failure of the primary link, whereupon the alternate link is activated and enabled to carry traffic;
  adding a selected non-zero port path cost bias to the one of the first and second port path costs associated with the alternate link such that, in an absence of a failure of the primary link or the network-edge switch to which the primary link is coupled, the port path cost associated with the primary link is lower than the port path cost associated with the alternate link;
  assigning a port priority to each of the primary link and the alternate link;
  adding a non-zero port priority bias to the port priority assigned to the alternate link; and
  configuring the spanning tree algorithm to select as the primary link the one of the first and second links having a lowest port priority.

2. The computer-readable medium of claim 1, wherein the configuring one of the first and second links as a primary link and the other of the first and second links as an alternate link includes forcing a port path cost associated with a selected one of the first and second links to be higher than a port path cost associated with the other of the first and second links such that the spanning tree algorithm is configured to always configure the link associated with a lowest port path cost as the primary link.

3. The computer-readable medium of claim 2, wherein the forcing a port path cost associated with a selected one of the first and second links to be higher than a port path cost associated with the other of the first and second links includes adding a non-zero port path cost bias to the selected port path cost.

4. The computer-readable medium of claim 3, further comprising, upon failure network-edge switch or the primary link, increasing the port path cost associated with the primary link such that the port path cost of the alternate link is lower than the port path cost of the primary link and wherein the spanning tree algorithm running step is carried out such that the spanning tree algorithm activates and enables the alternate link to carry traffic.

5. The computer-readable medium of claim 1, further comprising detecting a failure in the primary link or a failure

20 in the one of the first and second network switches to which the primary link is coupled and, upon detection of the failure, enabling the alternate link to carry traffic.

6. The computer-readable medium of claim 1, wherein the second network-edge switch and the first network edge switch are part of a first communication network.

7. The computer-readable medium of claim 1, wherein the first network edge switch is part of a first communication network and wherein the second network-edge switch is part of a second communication network.

8. The computer-readable medium of claim 1, wherein the access switch includes a Media Access Control (MAC) bridge, with the first network-edge switch including a first network-edge MAC bridge and with the second network-edge switch including a second network-edge MAC bridge.

9. The computer-readable medium of claim 1, wherein the access switch includes a router, with the first network-edge switch including a first network-edge router and with the second network-edge switch including a second network-edge router.

10. The computer-readable medium of claim 1, further comprising configuring first and second Virtual Local Area Networks (VLANs) in the first communication network, and wherein the running step runs a first spanning tree algorithm for the first VLAN and a second spanning free algorithm for the second VLAN and, based upon a result of running the first and second spanning tree algorithms, configuring one of the first and second links as a primary link for the first VLAN and as an alternate link for the second VLAN and the other of the first and second links as an alternate link for the first VLAN and as a primary link for the second VLAN.

11. The computer-readable medium of claim 10, further comprising enabling the second link to carry traffic for both the first and second VLANs upon failure of the first link and further comprising a step of enabling the first link to carry traffic for both the first and second VLANs upon failure of the second link.

12. A non-transitory computer-readable medium that stores computer-executable instructions that, when executed, cause one or more processors to perform operations comprising:
  running a spanning tree algorithm to select, for each access switch of a plurality of access switches, a network-edge switch respectively coupled to each of the plurality of access switches, each access switch being included in a respective access cluster including a plurality of computing hosts;
  configuring each of the plurality of access switches to communicate with its selected network-edge switch, independently of the other ones of the plurality of network-edge switches;
  detecting a failure of one of a plurality of links or a failure in one of the plurality of network-edge switches;
  identifying which access switch is affected by the failure;
  running the spanning tree algorithm to select a new network-edge switch for the affected access switch,
  wherein the running the spanning tree algorithm is based at least on a plurality of port path costs respectively associated with the plurality of links;
  configuring the affected access switch to begin communicating with the selected new network-edge switch; and
  configuring one of the plurality of links as a primary link and ones of other of the plurality of links as alternate links, wherein only the primary link is active and enabled to carry traffic until failure of the primary link, whereupon the alternate links are activated and enabled to carry traffic;

wherein one of the plurality of links is associated with a first port path cost and the other ones of the plurality of links are associated with respective second port path costs each higher than the first port path cost, wherein a selected non-zero port path cost bias is added to the one of the first and second port path costs associated with the alternate links such that, in an absence of a failure of the primary link or the network-edge switch to which the primary link is coupled, the port path cost associated with the primary link is lower than the port path cost associated with the alternate link, and wherein a port priority is assigned to each of the primary link and the alternate link, a selected non-zero port priority bias is added to the port priority assigned to the alternate link, and the spanning tree algorithm is configured to select as the primary link one of the plurality of links having a lowest port priority.

13. The computer-readable medium of claim 12, further comprising configuring the selected new network-edge switch to communicate with more than one access cluster.

14. The computer-readable medium of claim 12, wherein each access cluster includes a plurality of computing hosts, each computing host including at least one processor and a network interface card (NIC), the NIC being coupled to the access switch.

15. The computer-readable medium of claim 12, wherein each of the plurality of access switches includes a Media Access Control (MAC) switch and wherein each of the plurality of network-edge switches includes a network-edge MAC bridge.

16. The computer-readable medium of claim 12, wherein each of the plurality of access switches includes a router and wherein each of the plurality of network-edge switches includes a network-edge router.

17. The computer-readable medium of claim 12, wherein each access cluster is a single field replaceable unit configured to accommodate at least one computing host and the access switch.

18. The computer-readable medium of claim 14, wherein the NIC and the access switch are provided in a single device.

19. The computer-readable medium of claim 12, wherein the respective access cluster selects different values for the non-zero port path cost bias.

20. The computer-readable medium of claim 12, wherein the respective access cluster selects different values for the non-zero port priority bias.

* * * * *